R. ESCHE.
LINING FOR GRAIN SPOUTS AND CHUTES.
APPLICATION FILED AUG. 25, 1919.
1,382,897. Patented June 28, 1921.
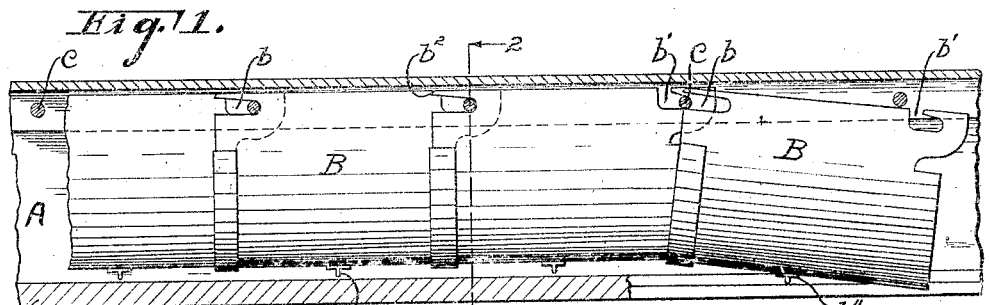
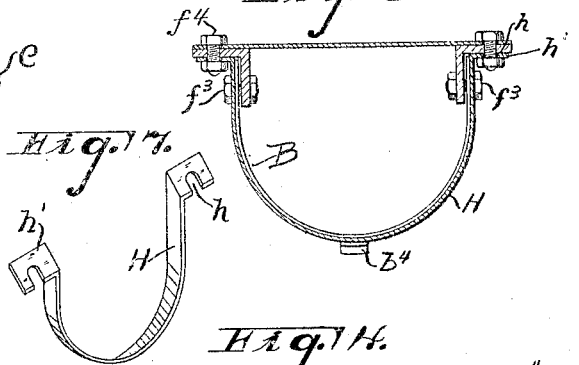
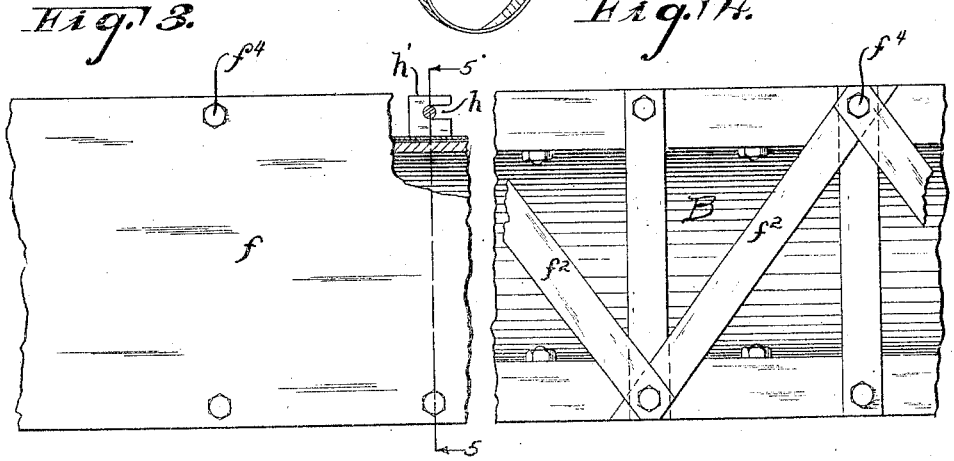
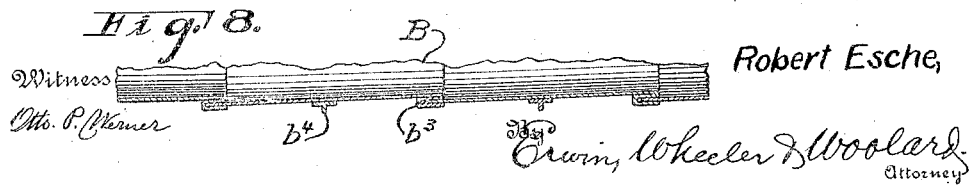
Inventor
Robert Esche,
Witness
Otto P. Werner
Erwin, Wheeler & Woolard
Attorney

UNITED STATES PATENT OFFICE.

ROBERT ESCHE, OF MILWAUKEE, WISCONSIN.

LINING FOR GRAIN SPOUTS AND CHUTES.

1,382,897.  Specification of Letters Patent.  Patented June 28, 1921.

Application filed August 25, 1919. Serial No. 319,774.

*To all whom it may concern:*

Be it known that I, ROBERT ESCHE, a citizen of the United States, and a resident of the city of Milwaukee, county of Milwaukee, and State of Wisconsin, have invented certain new and useful Improvements in Linings for Grain Spouts and Chutes; and I do declare that the following is a full, clear, and exact description thereof, such as will enable persons skilled in the art to which the invention pertains to make and use the same, reference being had to the drawings hereto attached for disclosure as to certain details of construction.

My invention relates to that class of spouts and chutes which are used to convey materials from one point to another, such spouts and chutes being placed at a suitable inclination, so that the materials to be conveyed will be moved by the force of gravity.

The invention embodies a lining section for the spout or chute. As is well known, the wear upon linings of this class is very great while in use, the friction of the materials upon the lining while passing therethrough rapidly wearing holes in the lining so as to render the same wholly unserviceable, and necessitating replacement and repairs.

In particular, spouts and chutes as generally used in the milling industry for conveying flour and grain, have been made of considerable length, the sections thereof being permanently fastened together to form the desired lengths. When one of these sections became so worn as to be unserviceable it was necessary to take out the entire length of lining, and replace it by a new one. This practice has involved considerable loss, inasmuch as the lining, entirely serviceable in the main, was discarded by reason of the unserviceability of a small portion thereof.

My improved lining is made in sections which are constructed upon the unit system. The sections are provided with attaching means whereby such sections may be connected to others, and when the sections are assembled, they are secured or locked in position to form a spout or chute of the desired length. The fastening devices which are employed to secure the sections in proper relation to form the complete spout or chute, are such as to permit the sections to be easily removed, when they become worn and unserviceable. The worn sections may be replaced by new ones, and the integrity of the spout or chute restored with a minimum loss of time.

While my spout or chute has been particularly constructed for use as a conveyer for flour and grain, it is apparent that it may be used as a conveyer for materials of a different nature, and that my invention is the same, whether embodied in a grain chute, a flume, or a chute for gravel or coal.

In the drawings which form part of this specification,

Figure 1 is a view in side elevation on the line 1—1, Fig. 2, showing a section of a spout or chute constructed in accordance with my invention, and broken out longitudinally to show the manner of engagement of the sections with their support.

Fig. 2 is a vertical sectional view on the line 2—2, Fig. 1.

Fig. 3 is a plan view, partly broken out, of my invention adapted for conveying heavy materials, and provided with cover to make a closed chute.

Fig. 4 is a similar section showing a flume.

Fig. 5 is a sectional view on the line 5—5, Fig. 3, showing the manner in which the chute sections, Figs. 3 and 4, are attached to their supports.

Fig. 6 is a section of a locking strip which may be employed for the purpose of clamping the lining sections in position.

Fig. 7 is a perspective view of a clamping yoke, which may be applied to my improved lining.

Fig. 8 is a sectional detail showing how the abutting ends of the lining sections may be interlocked.

In milling, the flour or grain is generally conveyed by the force of gravity through a spout or chute which is formed as a lining for a box, rectangular in cross section, of considerable length. Such a box is indicated A on the drawing, and is well known in the industry to which the present invention pertains. This box is formed of a top and two sides, with a removable bottom $A^1$. The edges of the bottom piece are rabbeted so as to fit within and complete the closure of the box.

My invention resides in the lining sections B, which are of peculiar and novel form. These lining sections are secured to the underside of the top section of the box by means which renders such sections easily and readily removable, without disturbing or displacing other than the particular section or sections which it is desired to replace. These lining sections are punched from sheet metal and are provided at two opposite corners with open slots $b^1$. In cross section, the lining may be curved as shown in Fig. 2, or angular in any degree desired, the formation of the channel being imparted to the lining when the blank from which it is formed is bent into the desired shape.

At measured distances throughout the length of the box, screws $c$, are loosely passed through the side pieces into the top piece. In placing the lining sections in position, the opposite open slots $b$ in the lower end of one of the sections are passed into the slightly open space between the side and top pieces and about two alined screws $c$, the corners of the sections being rounded at $b^2$, to permit ready insertion of the section. The next pair of alined screws $c^1$ is now opposite the entry to the bayonet joint slots $b^1$, in the upper end of the section, and the said second pair of screws is passed into the slot. By imparting a slight longitudinal movement to the sections, the four screws will be seated in the ends of the slots in the lining section. The lower end of the second section is now inserted inside the upper end of the section already in position, after the manner illustrated at the right in Fig. 1 of the drawings. The operation described is followed until all of the lining sections have been assembled in place, and the desired length of the spout has been completed. The screws are now tightened, so that the top and side pieces of the box are clamped together, and a tight joint between the sections is produced, the latter being firmly secured in place. The leading end of each section is not thicker than the gage of the metal from which it is formed, but the rear end of each section is grooved or recessed to receive the leading end of the next section. As shown in Fig. 8, the groove or recess is formed in the lining section by folding the sheet metal, as at $b^3$.

To the bottom of each of the lining sections a small ear $b^4$ is attached. The purpose of this attachment is to afford a means whereby a worn section may easily be removed from any point in the length of the spout or chute. When such a contingency arises it is necessary only to loosen the screws $c$ which bind the defective lining section, and by slightly tapping upon the ear piece $b^3$, a section may be made to move so that the closed ends of the slots therein will no longer engage the screws $c$, and the section may be withdrawn from its position as a part of the spout or chute. In order to disengage the sections at the point $b^3$, Fig. 8, it will be necessary to drive back one or two additional sections, until the necessary clearance between the sections is provided. The manner of original assembly hereinbefore described will be followed in substituting a new section for the one which has become worn and unserviceable.

Referring now to Figs. 3, 4, and 5, in which my invention is embodied in a flume or chute for heavy materials, which do not require the inclosing box previously described, the conveying section B will be formed as before. To utilize my invention in this connection I construct a supporting frame of the desired length by arranging two angle irons F in parallel relation. These angle irons are retained in parallelism by a cover plate $f$, in the construction shown in Figs. 3 and 5, when it is desired to make a closed chute, and by ties $f'$ and diagonal braces $f^2$, when the construction is embodied in a flume. The depending flanges of the angle irons F will be bored at measured distances, and may be threaded for the reception of screws or bolts $f^3$, which latter will act to bind the conveyer sections in position after the manner previously described. The clamping strip G, with notches spaced to receive the bolts $f^3$, may be positioned to effect a better locking of the parts, and yokes H, Fig. 7, with notches $h$, in their ears $h^1$, may be secured by the bolts $f^4$, which latter secure the cover $f$ or the braces $f^2$ to the angle irons. By means of the yokes H, a closer joint is produced in the heavier construction, and additional support for the sections is provided.

While I have described my lining as formed of sheet metal, it is obvious that such lining may be cast, and that at the time of casting the retaining devices described may be provided. The interlocking arrangement of the succeeding sections, as indicated in Fig. 8, may be omitted if desired.

Having thus described my invention, what I claim and desire to secure by Letters Patent is:

1. A spout for conveying materials, consisting of a series of lining sections, and a support to which the sections are detachably connected, such sections being formed as channels of the desired shape, and provided with open slots in their edges which engage the attaching means on the support.

2. A spout for conveying materials, consisting of a series of lining sections, and a support for said sections provided with means for holding the latter in position, said section being provided with open slots upon each of its longitudinal edges for engaging the holding means on the support.

3. A spout for conveying materials, consisting of a series of lining sections arranged with the leading end of one section inside of the rear end of the preceding section, a support for the sections, and each of the sections provided with slots upon each of its longitudinal edges for engaging holding means on the said support.

4. A spout for conveying materials, consisting of a series of lining sections arranged with the leading end of one section inside of the rear end of the preceding section, a support for the sections, and each of the sections provided with slots for engaging holding means on the said support, and an ear attached to the outer side of each lining section, to permit the application of pressure to remove the section from its support.

5. A spout for conveying materials, comprising a series of interlocking lining sections, and a support therefor, each section being provided at its edges with open slots for engaging the holding means upon the support, and clamping devices for tightening the joints between the sections.

Signed at Milwaukee, this 11th day of August, 1919.

ROBERT ESCHE.

Witnesses:
 E. G. RAHR,
 ROSE C. RAHR.